July 16, 1957  T. I. LINDHAGEN ET AL  2,799,253
ELASTIC FLUID ACTUATED POWER SYSTEMS
Original Filed Sept. 30, 1947  6 Sheets-Sheet 5

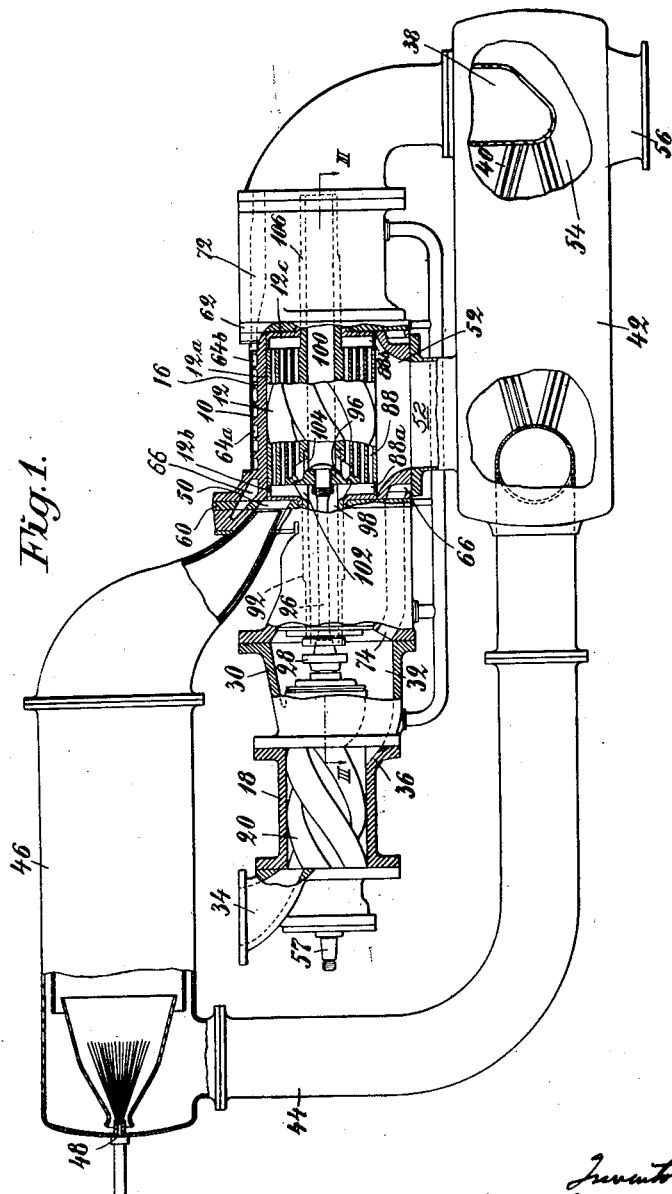

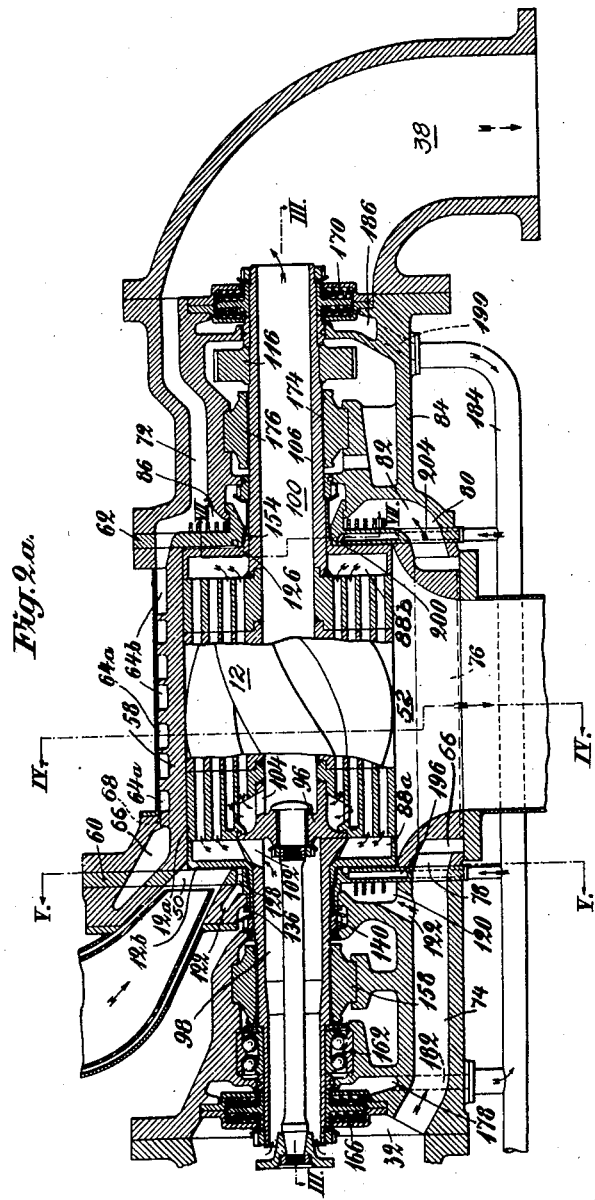

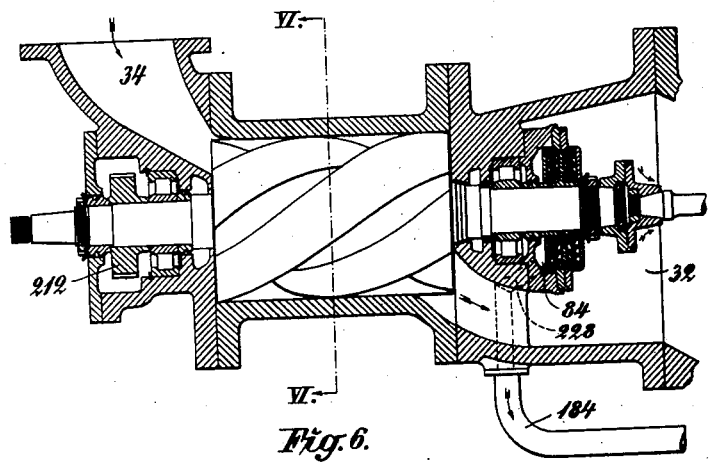
Fig. 2.b.
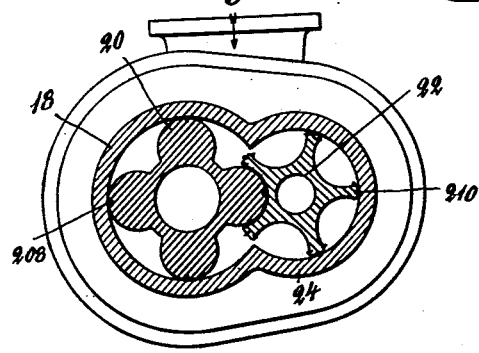
Fig. 6.
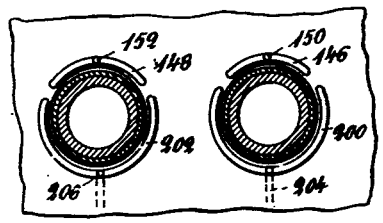
Fig. 7.

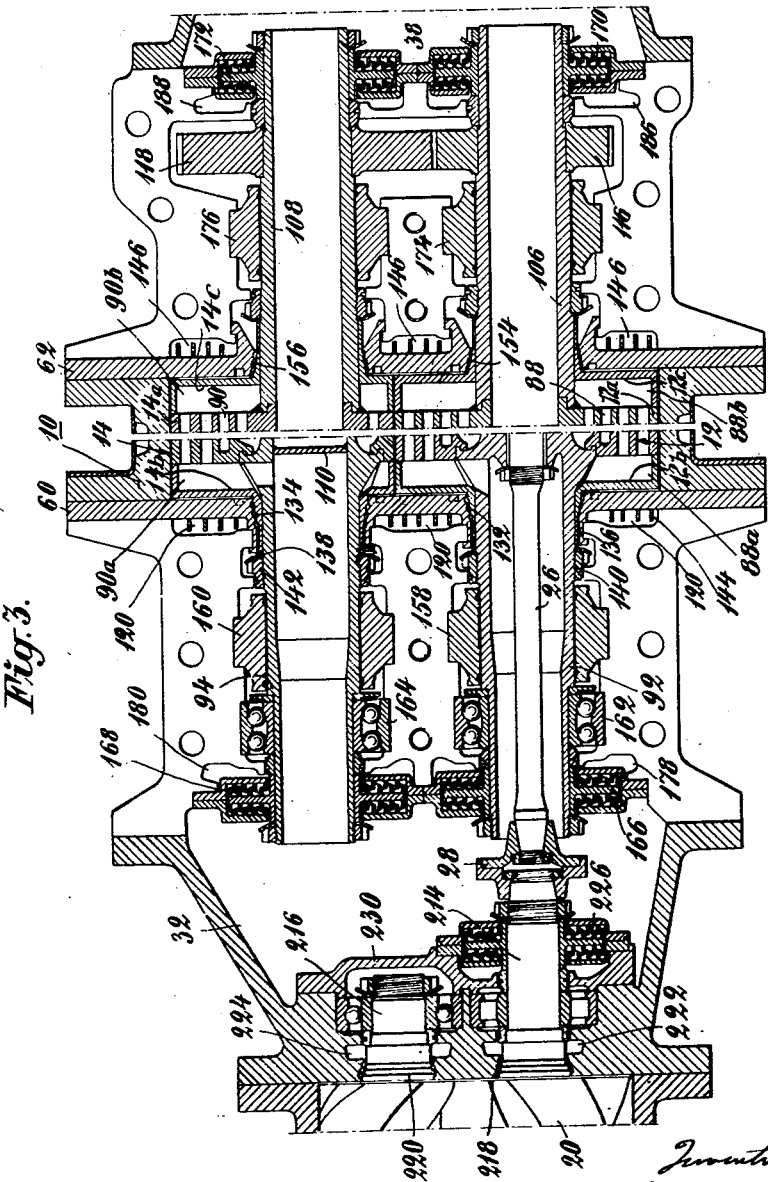

July 16, 1957  T. I. LINDHAGEN ET AL  2,799,253
ELASTIC FLUID ACTUATED POWER SYSTEMS
Original Filed Sept. 30, 1947  6 Sheets-Sheet 6
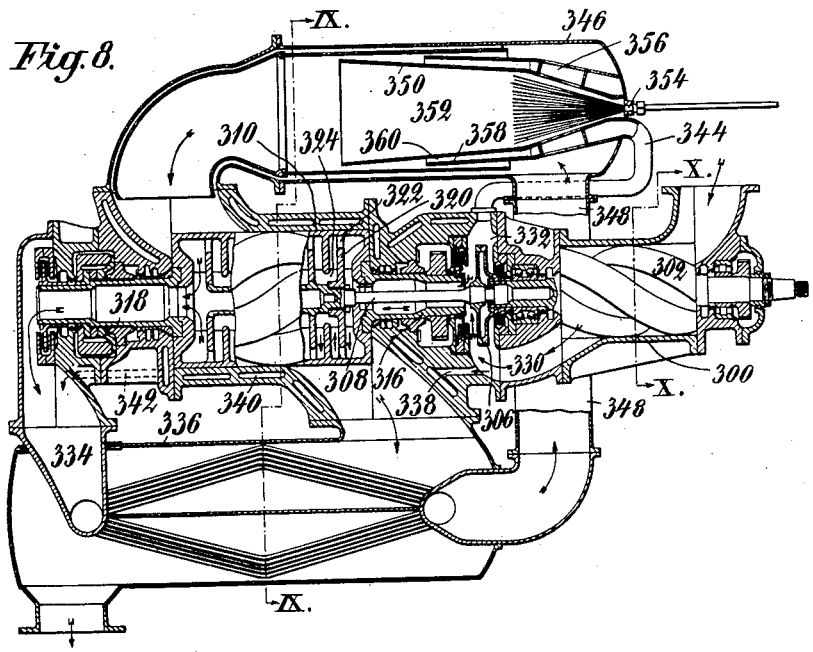
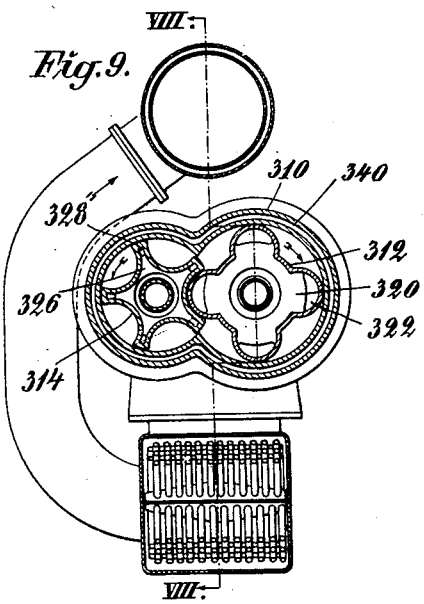
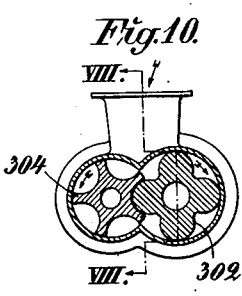

United States Patent Office 2,799,253
Patented July 16, 1957

2,799,253

ELASTIC FLUID ACTUATED POWER SYSTEMS

Teodor Immanuel Lindhagen and Hans Robert Nilsson, Stockholm, Sweden, assignors, by mesne assignments, to Svenska Rotor Maskiner Aktiebolag, Nacka, Sweden, a corporation of Sweden Original application September 30, 1947, Serial No. 776,928. Divided and this application May 21, 1952, Serial No. 289,934

10 Claims. (Cl. 121—70)

The present invention relates to elastic fluid actuated power systems and has particular reference to such systems of the kind in which motive fluid generated by the heating of a gaseous medium compressed in the system is directly employed for the production of power by expansion in the system.

In all such systems the attainable thermal efficiency of the cycle is largely influenced by the effective heat drop that can be obtained from the motive fluid in the expansion phase, which in turn is largely influenced by the initial temperature of the motive fluid and the amount of heat rejected to the surfaces with which the motive fluid comes in contact while expanding.

Consequently, one objective constantly sought has been the provision of a system enabling the highest possible initial temperature of the motive fluid to be used that can effectively be employed. From this standpoint alone the diesel cycle is relatively effective, but has among other limitations the necessity of employing lubricated surfaces which are in contact with the high temperature gases and which consequently must be maintained at relatively low temperature by the aid of a cooling system to which large quantities of the available heat are rejected and lost. The advantages of the gas turbine as a means for utilizing motive fluid having high initial temperature have long been recognized and recent developments in the metallurgical art have supplied materials capable of withstanding temperatures making the cycle practical. However, due to the inherent structural nature and arrangement of turbine blade systems and the stresses to which turbine blades must necessarily be subjected, it has up to the present time proved to be impractical to cool turbine blading to a temperature very materially below the temperature of the motive fluid with which they are in contact. This circumstance thus requires that the maximum temperature of the motive fluid must be limited to a value not materially above the temperature at which the blading will continuously operate under the stress to which it is subjected. With the best materials now available, the maximum initial gas temperature that can practically be used with safety in a turbine having an acceptable length of life is far below that which is desirable from the standpoint of high thermal efficiency, and even the temperatures now in use can be made available only by employing materials which make the turbine structure, and particularly the blade system, extremely expensive.

With the limitations of presently available systems in mind, the general object of the present invention is the provision of a novel power system the nature of which permits, with apparatus constructed of presently available materials, the practical utilization of motive fluid at temperatures very much higher than are practical with gas turbines and in which the several limitations of lubricated reciprocating internal combustion engines are avoided. Other and more particular objects are the provision of a system in which the energy converting surfaces coming in contact with the motive fluid in the expansion phase of the cycle may be operated at higher temperatures than have heretofore been feasible with existing materials; in which, if desired, such surfaces can be uniformly and effectively cooled at a very high temperature level; and in which the cooling of such surfaces may be accomplished in such manner as to avoid substantial thermal loss from rejection of heat from the system because of the cooling.

For the accomplishment of the above noted and other and more detailed objects hereinafter appearing, the invention contemplates the provision of rotary apparatus of the space packed expansible chamber type for the energy converting unit or units of the system. It further contemplates the operation of such apparatus with the dry walls of the space packed working chambers at temperature levels very materially above those possible with lubricated surfaces; further it contemplates the cooling of such surfaces at high temperature level to an extent enabling motive fluid to be expanded from an initial temperature very much higher than even the high temperature of the working surfaces; and still further it contemplates the cooling of the working surfaces by a compressed gaseous fluid which is subsequently heated to high temperature and expanded as motive fluid in the working chambers, the walls of which were previously cooled by the compressed fluid.

For a better understanding of the more detailed nature of the invention, reference may be had to the ensuing portion of this specification, taken in conjunction with the accompanying drawings, which disclose suitable examples of apparatus for carrying the invention into effect.

In the drawings:

Fig. 1 shows as an example a general arrangement of a system embodying the invention comprising compressor and engine of the positive displacement type together with combustion chamber and regenerator built up to form a single power unit.

Fig. 2a shows a longitudinal, central section of the engine of Fig. 1.

Fig. 2b shows a longitudinal, central section of the compressor of Fig. 1.

Fig. 3 shows a longitudinal, horizontal section of engine and outlet end of the compressor taken on the lines III—III of Fig. 2a.

Fig. 4 shows a transverse section of the engine taken on the line IV—IV of Fig. 2a.

Fig. 5 is a transverse section of the engine taken on the line V—V of Fig. 2a.

Fig. 6 is a transverse section of the compressor taken on the line VI—VI of Fig. 2b.

Fig. 7 is a transverse section of the engine taken on the line VII—VII of Fig. 2a.

Fig. 8 is a longitudinal, transverse section similar to Fig. 1 of an arrangement in which the air supply is utilized partly for engine cooling and partly for cooling the combustion chamber.

Figs. 9 and 10 are cross-sections taken on the lines IX—IX and X—X of Fig. 8 showing engine and compressor structure.

Figure 4:
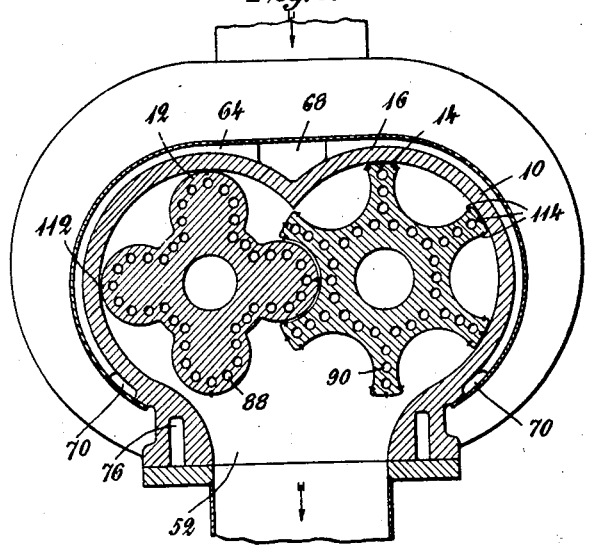

Referring now to the system shown in Fig. 1 and related figures, the prime mover or engine of the system is indicated generally at 10 and is of the space packed expansible chamber or positive displacement type in which the working chambers are formed by the cooperation of intermeshing rotors 12 and 14 having helical lands and grooves and rotating in a suitable casing structure 16 provided with inlet and outlet ports 50 and 52, respectively, for admission and discharge of elastic motive fluid. The more detailed construction of the engine will be described later.

The compressor for the system is indicated generally at 18 and advantageously, as shown, is of the same general type of device as the engine, having intermeshing helically grooved rotors 20 and 22 mounted to rotate in a suitable casing 24 to form space packed variable volume chambers for positive displacement compression of elastic fluid, which in the present instance is air.

By means of a power shaft 26 and coupling 28 connecting rotors 12 and 20, the compressor 18 is directly driven by engine 10.

In the embodiment illustrated the engine and compressor are assembled to form a single power unit, the casing structure of the engine and compressor being connected by an intermediate housing structure 30, providing among other things a distributing chamber 32 for compressed air delivered by the compressor. Air inducted into the system through the compressor inlet port 34 is delivered through the discharge port 36 to the distributing chamber 32, from whence through suitable channels to be described more in detail later, the compressed air is caused to flow through the casing structure and rotors of the engine as a cooling medium before being utilized further in the system. In the present system, a regenerator is employed for the recovery of waste heat from the exhaust gases and the air leaving the engine, after performing its cooling function, flows through duct 38 and suitable heat exchange tubes 40 in a suitable regenerator 42 to the duct 44 connecting the regenerator with a combustion chamber indicated generally at 46, to which fuel is supplied through a suitable burner 48 for combustion with the air to produce high temperature motive fluid comprising products of combustion for expansion in the engine. From the combustion chamber the motive fluid is admitted through the inlet port 50 of the engine to the working chambers and is exhausted from the latter through port 52 to the gas space 54 of the regenerator, which discharges to waste through the outlet 56.

Net useful power from the system for carrying external load is taken off through the power shaft 57 connected to the compressor rotor 20 to which power is delivered from engine 10.

Referring now more particularly to Figs. 2 to 7 for the more detailed nature of the construction of the present embodiment, the engine casing comprises a central barrel member 58 closed at its ends by plate like end members 60 and 62, member 60 providing the inlet 50 for motive fluid. The barrel 58 is provided with a series of perimetrally extending cooling passages 64 divided into groups 64a and 64b, through which cooling air flows.

Air is admitted to the group 64a from an annular admission chamber 66 through top ports 68 (Fig. 4) and flows downwardly around the barrel to ports 70 through which it passes to group 64b. Through the latter it flows upwardly to be discharged from the casing through passage 72 connected to the duct 38. The admission chamber 66 is connected by means of the duct 74 through port 78 to the distributing chamber 32. An annular cooling channel 76 is provided around the wall of the exhaust port 52. This channel 76 joins chamber 66 and together with chamber 66 is supplied with air through port 78 communicating with passage 74 and discharges through a suitable port 80 to a chamber 82 in the housing member 84. From chamber 82 the air flows to the duct 38 by way of port 86 communicating with the passage 72.

The rotors 12 and 14, in the embodiment shown, are of built up construction comprising annular central members 12a and 14a respectively, and end members 12b and 14b and 12c and 14c respectively. The central members 12a and 14a are for manufacturing reasons advantageously built up of welded together sections, as shown, and are provided with a large number of cooling passages 88 and 90, extending longitudinally of the lands of the rotors and so disposed with reference to the surfaces of the lands and grooves that effective and uniform "skin" cooling of the rotor surfaces may be obtained. As will be seen particularly from Fig. 4, the size and number of cooling passages provided is such that their surface area exceeds that of the external surface of the rotor lands and grooves, to provide what is in effect an extended, cooling surface, a consideration of importance as will hereinafter appear. As will be seen from Fig. 3, the end members of the rotors are of cup like form, providing annular distributing chambers 88a and 88b, and 90a and 90b, in the respective rotors.

At the driving end of the engine, the rotors are mounted by means of hollow shafts 92 and 94 respectively, both of which project at their open ends into the distributing chamber 32. The driving shaft 26 is fixed to the central member of the body of rotor 12 by means of a connection 96 which blocks the flow of air from the annular space 98 between the drive shaft and the hollow rotor shaft 92 to the central bore 100 of the rotor body member 12a. The shaft 92 is provided with ports 102 for flow of air to the distributing chamber 88a, which in turn delivers it to the radially outer group of cooling channels 88, the inner group being blocked off from communication with chamber 88a as will be seen from Fig. 2a. The air flow is thus through the outer group to chamber 88b and back through the inner group, the latter discharging by way of radial ports 104 to the central bore 100. The other ends of the rotors are carried by hollow shafts 106 and 108 respectively and as will be seen from Fig. 2a the central bore 100 of rotor 12 communicates with the bore of shaft 106 to discharge cooling air to the duct 38. The cooling arrangement for rotor 14 is similar to that described in connection with rotor 12 and need not be repeated in detail, except to note that owing to the absence of a driving connection such as connection 96 in rotor 12, a blocking diaphragm 110 (Fig. 3) is provided to force the cooling air from shaft 94 to the distributing chamber 90a.

While insofar as the present invention is concerned in its broader aspects, the specific form and profile of the rotors and other details of the engine are not critical, the preferred profile is that shown in Fig. 4, which forms the claimed subject matter of the application of Hans Nilsson, Serial No. 684,495, filed July 18, 1946, said application having been abandoned in favor of a continuation-in-part application Serial No. 761,265, filed July 16, 1947, the latter application having matured into Patent No. 2,622,787, granted December 23, 1952. The primary reason for this preference is that it permits the practical employment of sealing strips or fins 112 and 114 for the purpose of reducing to a minimum the clearance space between the rotors and between the rotors and casing. The proper phase relation between the rotors is maintained by suitable timing gears 116 and 118 mounted on shafts 106 and 108 respectively, and for the high temperature level that is contemplated for operation of the engine, the use of sealing strips is highly advantageous, since it permits the use of commercially more practical clearances to be provided between the rotor and casing surfaces without reducing efficiency because of excessive leakage through the "space packing" provided by the clearances, than would otherwise be possible. Also, if in actual use abnormal circumstances arise, as for example excessive wear of the timing gears or unusual changes in dimensions owing to abnormal thermal expansion or contraction of the parts, the larger clearances diminish the chance of rubbing contact between large surface area of rotors and/or casing. Rubbing contact by the sealing strips due to abnormal conditions is not seriously harmful and such strips may readily be replaced if badly worn or damaged by accident. So far as the number and material of the rotors employed, the number of lands and grooves, helix angle, specific port design and other like factors are concerned, these will be determined by the specific conditions of capacity, pressure, expansion ratio, temperature and other factors affecting the design for a given purpose and may vary widely within the scope of this invention. The determination of such design factors in apparatus of the general type under consideration is well known and need not be enlarged upon herein for an understanding of this invention.

Reverting to the factor of providing adequate and uniform cooling for the engine, the present embodiment provides for cooling of the end walls of the casing and rotors and the high temperature ends of the rotor shafts by means now to be described. The housing structure adjacent to the end plate 60 provides a chamber 120 (Figs. 2a and 3) extending around the rotor shafts and supplied with high pressure cooling air through port 122 leading from the passage 74. As will be seen more clearly from Fig. 5, the face of the end plate 60 facing the rotors is provided with grooves 124 and 126 extending around the rotor shafts on the inlet or high pressure side of the engine and in communication with chamber 120 through ports 128 and 130 respectively in the end plate. High perssure cooling air flows from these grooves into the clearance spaces between the rotor ends and the end plate and a part flows from the clearance space into the engine to mingle with the motive fluid. Another part flows from the clearance space through the packings 132 and 134 between the hub portions of the rotor members 88a and 90a respectively and the shaft openings in the end plate. These packings are of well known form of the so called leakage or labyrinth type which depend for their sealing effect on the pressure drop of leakage fluid flowing through restricted clearances in the packing. In this instance the leakage air acts to cool the shaft ends and is discharged from the seals to atmosphere through the venting spaces 136 and 138 provided between the stationary housing structure and the retaining nuts 140 and 142 which clamp the rotor end members 88a and 90a in place. The end plate 60 is provided with cooling fins 144 providing extended surface cooled by the flow of air through chamber 120. At the opposite end of the rotors the cooling on the high pressure side is similarly effected. The chamber 82 facing the end plate 62 supplies high pressure cooling air to channels 146 and 148 (Fig. 7) through ports 150 and 152 for flow through the end clearance space in the engine and through the shaft seals 154 and 156 to atmosphere.

On the lower or exhaust side of the engine, the pressure difference between the motive fluid and the high pressure air is such that it is desirable to provide air at lower pressure to cool the rotor ends and in this construction this is provided for in the following manner.

At the driving end of the engine, the shafts 92 and 94 are carried by bearings 158 and 160 and there are further provided the thrust bearings 162 and 164 for taking the axial thrust of the rotors. From the standpoint of lubrication of these bearings it is desirable not to have the chamber in which they are located under pressure and seals of the leakage or labyrinth type, shown at 166 and 168 are provided to prevent compressed air from flowing from the distributing chamber 32 to the bearing chamber.

Similarly, such seals, shown at 170 and 172 are provided to prevent flow of compressed air from the duct 38 to the chamber housing the timing gears 116 and 118 and the bearings 174 and 176 carrying the rotor shafts 106 and 108.

On the low pressure side of the packings 166 and 168, chambers 178 and 180 are provided to collect leakage air, which is discharged through suitable connections, one of which is shown at 182 in Fig. 2a, to a manifold 184. Similarly, leakage air from seals 170 and 172 is collected in chambers 186 and 188 and delivered to manifold 184 through one or more connections 190. These seals and their connections thus serve a two fold purpose. They eliminate pressure from the bearing chambers due to the compressed air and they make available a supply of leakage air at reduced pressure suitable for cooling the low pressure sides of the rotor ends. This cooling is accomplished in much the same fashion as previously described for the high pressure side. The end plate 60 is provided with grooves 192 and 194 (Fig. 5) on the low pressure side receiving low pressure air from manifold 184 through connections 196 and 198 in the end plate, which are in turn connected with manifold. Likewise the low pressure air is supplied to the low pressure side of the rotors at the other end through grooves 200 and 202 (Fig. 7) and connections 204 and 206.

Figure 5:
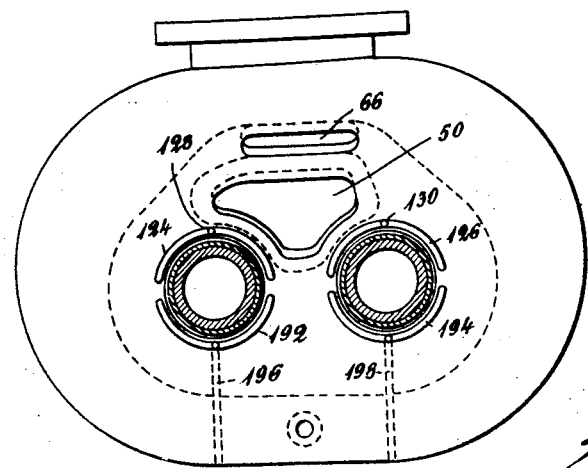

It will be observed from comparison of Figs. 5 and 7 that the high pressure grooves 124 and 126 in the inlet end plate 60 are considerably longer than the high pressure grooves 146 and 148 in the end plate 62, with the low pressure grooves 192 and 194 in plate 60 correspondingly shorter than grooves 200 and 202 in plate 62. The reason for this is that due to the helical form of the grooves providing the working chambers, the latter are peripherally wider at the inlet end than at the opposite end when they register with the outlet port and the pressure in them falls.

In the embodiment shown, the compressor 18 is of the same general type of screw wheel device as the engine 10 and with the rotors preferably having profiles of the form disclosed in the previously mentioned Nilsson application Serial No. 684,495, which permits the employment of packing strips 208 and 210 what in turn enable clearances of commercially desirable magnitude to be used without impairing efficiency. Since the general type of compressor is known (see U. S. Patent No. 2,243,874 for example) it need not be described in detail here, except that it should be noted that depending upon desired capacity, compression ratio, speed of operation and like factors the number of rotors, number of grooves per rotor, helix angle and port design may vary, as in the case of the engine. If desired the compressor may be cooled, but ordinarily, if cooling is employed, it will be sufficient to simply jacket the casing for a cooling medium such as water, since the temperature level of the compressor is very low relative to that of the engine.

In the present design, the compressor rotors 20 and 22 are carried in suitable bearings including bearings for taking axial thrust load, and the rotors are maintained in their proper phase relation by timing gears one of which is shown at 212 in Fig. 2b. At the high pressure end of the compressor the rotor shafts 214 and 216 are provided with leakage type seals 218 and 220 discharging to vented chambers 222 and 224 and the shaft 214 is sealed by a further leakage type seal 226 the flow from which is carried by connection 228 to the low pressure cooling air manifold 184. A cover plate 230 covers the end of shaft 216, and as will be evident from the drawing, the bearing chamber at the high pressure end of the compressor is thus maintained free from pressure. This arragmenent, in conjunction with the arrangements provided for the bearing chambers of the engine, thus enables a single lubricating system to be employed from which lubricant can be supplied to all parts requiring it, at a common pressure.

From the foregoing description the operation of the apparatus will largely be apparent, but the nature and magnitude of the advantages obtainable are not wholly obvious and certain of the major advantages should therefore be pointed out.

As previously noted, the absence of internal lubrication in the engine enables the working surfaces to be operated at highly elevated temperatures limited only by the strength of the material to withstand the operating conditions. The nature of the engine also contributes to the possibility of high operating temperature, since it is characteristic of the type of apparatus employed that at rotor peripheral velocities suitable for highly efficient operation, the mechanical stresses imposed on the rotors by centrifugal force and other factors are comparatively low, which in turn permits a given material to be operated safely at higher temperature than would be the case under more severe stress conditions. Additionally the relatively continuously smooth working surfaces permit of much more effective and uniform cooling of these surfaces with absence of local hot spots than can for example be practically accomplished in the case of turbine blading, the thin exhaust edges of which are particularly difficult to cool and which moreover are subject to the most severe working conditions. In contrast with this, the packing strips employed in the present construction project such a short distance from the cooled rotor bodies (in a typical case a matter of about .01 to .02 inch in an engine having rotors of approximately 4 inches diameter) that the temperature difference between the roots and crests of the strips is not material. Furthermore, the cross section of the sealing strips may be made with triangular or similar cross section for facilitating heat conduction from the crests to the roots. Calculations show that for a practical and efficient design, surface temperatures of the order of 300° C. may be used with rotors of light weight metal such as the available aluminum alloys, while with mild steel temperatures of the order of 450° C. may be maintained and in the case of special materials such as stainless steel the working temperature may safely be of the order of 700° C. As better heat resistant materials are developed even higher surface temperatures may be attained.

Because the form of the apparatus affords the possibility of providing extended cooling surface close to the working surface, the extent of cooling that can be effected even with a gaseous cooling medium is such that a high temperature differential can be maintained between gas temperature and that of the working surfaces.

Calculations show that a temperature differential of as high as of the order of 800° C. may be obtained, so that even with the light weight metals which have relatively low maximum operating temperatures, initial gas temperatures of the order of 1100° C. are attainable, while with metal such as presently available stainless steel and other high temperature resistant alloys, initial temperatures of the order of 1500° C. may be reached. It is evident that such temperatures define an operating range far above that presently obtainable with gas turbines using even the best materials now available, this being due primarily to the facts that on the one hand it has not been found practical, in spite of many attempts, to maintain in an efficient turbine a temperature differential between the gas temperature and the hottest portions of a cooled blade system, of more than approximately 100° C., if that, and on the other hand that the mechanical stresses in the rotor blading of an efficient turbine are unavoidably high. Because of these and other limitations the highest safe initial temperatures for gas turbines utilizing the best of presently available materials is considered to be in the neighborhood of 800° C. while in the most successful systems so far actually built and operated, initial temperatures of the order of 700° C. are used. From a technically economical standpoint the lower limit of the temperature difference between the inlet gas temperature and the working temperature of the engine rotors in an apparatus according to the invention should suitably not be less than of the order of 200° C.

Because of the very much higher initial temperatures possible with systems embodying the present invention, the quantity of motive fluid that has to be circulated for a given energy output is very materially reduced, with consequent reduction in the size, weight and cost of apparatus required for a given energy output.

To obtain high thermal efficiency in any system of the kind under consideration, the use of a regenerator to recover heat from motive fluid exhausted from the prime mover is necessary, and the present invention is particularly advantageous because of the great extent to which the size of regenerator required for an efficient cycle can be reduced as compared with previous systems of like efficiency. For a typical system of the kind embodying the present invention and designed for an overall thermal efficiency of around 30% with an inlet gas temperature of 1200° C., the area of regenerator surface required is only approximately 60% of that required for a gas turbine system of like efficiency, even with the latter calculated on the basis of an inlet temperature of 800° C., which is above the value now employed in the latter type of system. Since regenerator structures are relatively bulky and heavy items of equipment, a saving of such magnitude is of material importance in systems intended for use in the aircraft field.

A further material advantage inherent in the present system is the fact that relatively high thermodynamic efficiency is obtainable with engines of small size and of the type contemplated. Consequently, efficient systems of much smaller power can be constructed than appear possible with turbine systems giving comparable results.

While in certain of its broader aspects the invention is not restricted to the utilization of rotary positive displacement compressors, the use of such a type, for at least one or more stages of compression, is much to be preferred to wholly dynamic compression. The basic reason for this is that because of the similarity of operating characteristics between the power producing and the compressing units of a system wherein positive displacement apparatus is used in both, the variations in efficiency, capacity and other factors of the two sides of the system, under different conditions of speed and load, so closely match one another that highly efficient operation of the system as a whole may be maintained over a relatively wide range of speeds and loads. Also, with positive displacement compression embodied in the system, a degree of stability is obtainable, even with sudden speed and load changes of considerable magnitude, that is difficult if not impossible to obtain with wholly dynamic compression.

While for the purposes of obtaining the desired cooling of the engine by liquid or other fluid media is within the scope of the broader aspects of the invention it will be evident that the use of a gaseous medium is highly advantageous, particularly for the purpose of cooling the rotors. At the high temperature levels contemplated, cooling in the liquid phase, even with high boiling point liquids, would be difficult if not impossible except with a high pressure system difficult to keep tight. Moreover, from the standpoint of uniformity of cooling, the cooling passages should be as close as practical to the surfaces requiring cooling. This requires, for the most satisfactory rotor cooling, passages at considerable distances from the axis of rotation, with consequent increase in centrifugal force stresses with liquid versus gaseous cooling. Additionally, the preferred gaseous cooling by a cooling medium which is subsequently utilized to produce motive fluid for operating the system, avoids the thermal loss inherent in any system, liquid or gaseous, which employs an independent cooling system to which heat is rejected.

The initial temperature level of the motive fluid usable with the present invention may be so high that in some instances it may be desirable to provide for special cooling of the combustion chamber as well as the engine. This of course can be accomplished by a separate cooling system for the combustion chamber. Such an expedient however results in a thermal loss from the system which is undesirable. Since the total quantity of compressed air available may be certain cases be more than required to adequately cool the engine, the air supply may in such instances be divided with one portion being utilized for engine cooling and another for cooling the combustion chamber. An arrangement of this kind is illustrated in Figs. 8 to 10. In this embodiment the compressor 300, having rotors 302 and 304, is essentially of the same construction as previously described and through coupling 306 and shaft 308 is driven by engine 310 having rotors 312 and 314. As in the previously described embodiment the engine rotors are provided with hollow shafts, those of the rotor 312 appearing at 316 and 318 in Fig. 8. In this case the form of the rotor bodies, insofar as cooling surface is concerned, is different from the previously described form. As shown in Figs. 8 and 9 the body of rotor 312 is provided with spaced radially extending diaphragms or baffles 320 provided with ports 322 and 324 located to produce zig-zag flow of cooling air through the rotor as indicated by the arrows in Fig. 8. The rotor 314 is similarly provided with baffles 326 similarly ported to produce zig-zag flow, certain of the ports appearing at 328 in Fig. 9. As will be evident from the drawing the internal baffles provide extended cooling surface and further provide for flow of the cooling air giving effective and uniform "skin" cooling of the working surfaces of the rotors.

Air from the compressor passes through the duct 330 to the distributing chamber 332. From this chamber a portion of the air flows through the rotors to the duct 334 leading to the regenerator 336. Another portion flows through one or more passages 338 to the jacket spaces 340 in the housing structure and from the latter to duct 334 through connections 342. Still another portion flows through connection 344 to the combustion chamber 346 to which air also flows from the regenerator through duct 348.

In the construction shown the combustion chamber is provided with an inner shell 350 providing an inner chamber 352 to which fuel is supplied through burner 354. Air for combustion is supplied to chamber 352 through ports 356 communicating with duct 348. An intermediate shell 358 is provided which surrounds the burner end of the inner shell in relatively closely spaced relation to provide an annular cooling chamber 360 to which cooling air from connection 344 is admitted and from which the air flows to the main chamber space of the combustion chamber.

From inspection of Fig. 8 it will be evident that the air reaching the combustion chamber through connection 344 will be at higher pressure than that reaching the chamber through duct 348, since the latter supply has a certain pressure drop caused by its flow through the engine cooling system and the regenerator, while the former flows through a direct connection from the distributing chamber 332. This pressure differential is utilized to create high velocity flow of cooling air through the jacketing chamber 360, capable of exerting substantial cooling of the inner shell 350 which is subjected to the most intense heat of the combustion zone.

While for the sake of simplicity the embodiment shown in Figs. 8 to 10 has been illustrated more or less diagrammatically it will be understood that advantageous details of construction shown in Fig. 1 and related figures may equally well be utilized in the embodiment just described.

The system embodying the present invention has been described herein as applied to plants in which the motive fluid is formed by combustion of fuel with compressed air in a single combustion stage. It will be understood however that the invention is not limited in its application to the use of motive fluid formed by these specific constituents, since for example the compressed medium may be a combustible gas such as blast furnace gas or the like which is burned to form the hot motive fluid with further addition of fuel, or air may be compressed and heated in a surface type heater to provide the motive fluid. Also it will be apparent that the invention is not limited to systems having only single stage compression and/or combustion but is equally applicable to multiple stage plants embodying several units; as is well known in the gas turbine art. Furthermore, while in the illustrated embodiments the net useful energy for external load purposes has been shown as delivered in the form of mechanical power, such energy may be taken from the system in other forms, as for example in the form of compressed air from the compressor side of the system, which is sufficiently large to absorb the full power of the engine side and which produces compressed air in excess of the motive fluid requirements.

This application is a division of applicants' copending application Serial No. 776,928, the latter application having been abandoned in favor of their continuation-in-part application Serial No. 289,161, which matured into Patent No. 2,627,161, granted Feb. 3, 1953.

From the foregoing it will be apparent that in its several aspects the invention may be embodied in widely different specific forms and combinations of apparatus, and that certain of the novel features disclosed may be used to the exclusion of others. The invention is therefore to be understood as embracing all forms of apparatus and modes of operation falling within the scope of the appended claims.

We claim:

1. A rotary expansible chamber machine having a casing and intermeshing rotors comprising bodies provided with helical lands and grooves cooperating with each other and with the casing to form said chambers, said rotors having passages for cooling fluid in the land portions thereof, there being a plurality of such passages in each of said lands and the surface area of the passages in each land being greater than the external surface area of the land in which they are located.

2. A machine as set forth in claim 1 in which the rotor bodies comprise central members and end closure members, removable from the central members to provide access to said passages for cleaning.

3. A machine as set forth in claim 1 in which said passages are located to conduct cooling fluid in proximity to the outer surface of the rotor over the entire perimeter thereof to effect substantially uniform and rapid heat transfer from said surface to the fluid.

4. A rotor comprising a body having helical lands and grooves, passages for cooling fluid located in the land portions of said body, aligned hollow shafts extending respectively from opposite ends of said body and connections for admitting cooling fluid to said passages from one of said shafts and exhausting the fluid through the other of said shafts, said rotor including a power transmitting shaft connected to said body and extending through one of said hollow shafts in spaced relation to the inner wall thereof to provide a passage for said cooling fluid between the two shafts.

5. A rotor as set forth in claim 4 in which the rotor body includes a central member having a plurality of cooling passages extending longitudinally of the lands and removable end members forming the end walls of the rotor body and providing for access to said passages when removed.

6. A rotor as set forth in claim 4 in which the rotor body includes a central member having a plurality of cooling passages extending longitudinally of the lands and end members forming the end walls of the rotor body, said end members providing chambers for connecting different ones of said passages and being removable to provide access to the passages for cleaning.

7. A rotor as set forth in claim 4 in which the rotor body includes a central member to which said hollow shafts are fixed and end members forming the end walls of the rotor body, said end members having hollow hubs fitted over the hollow shafts and being removably secured thereto to provide access to the ends of said central member.

8. An expansible chamber motor for high temperature motive fluid comprising a casing having an end wall, intermeshing rotors mounted to rotate in said casing and cooperating with each other and the casing to form said chambers, said casing having an inlet for admitting motive fluid to said chambers at one end of the rotors, and a passage for admitting a gaseous cooling fluid under pressure to the space between said end wall and the adjacent ends of the rotors.

9. An expansible chamber motor for high temperature motive fluid comprising a casing having an end wall, intermeshing rotors mounted to rotate in said casing about axes having a common plane and cooperating with each other and the casing to form said chambers, said casing having an inlet for admitting motive fluid to said chambers at one end of the rotor, said inlet being located substantially on one side of said plane constituting a high pressure side, said casing having an outlet for exhausting fluid from said chambers located substantially on the opposite side of said plane constituting a low pressure side, and passages for separately admitting cooling fluid at relatively high and relatively low pressures to the space between the end wall and the rotor ends on said high and low pressure sides respectively.

10. Apparatus of the character described comprising a rotary expansible chamber motor for high temperature motive fluid having a casing, rotors mounted to rotate in said casing and provided with hollow shafts, the interiors of said shafts communicating with chambers for admission and exhaust of gaseous cooling fluid under pressure to and from said rotors, leakage type seals between said shafts and the walls of the respective chambers and passages for conducting the fluid leaking through said seals to the spaces between the ends of the rotors and the adjacent end walls of the casing.

References Cited in the file of this patent

UNITED STATES PATENTS

| | | |
|---|---|---|
| 868,100 | Krehbiel | Oct. 15, 1907 |
| 922,875 | Fraser | May 25, 1909 |
| 990,742 | Jacobs | Apr. 25, 1911 |
| 1,247,973 | Langteig | Nov. 27, 1917 |
| 1,344,331 | Carrey | June 22, 1920 |
| 2,136,117 | Nichols | Nov. 8, 1938 |
| 2,243,874 | Lysholm | June 3, 1941 |
| 2,325,617 | Lysholm | Aug. 3, 1943 |
| 2,414,828 | McCollum | Jan. 28, 1947 |
| 2,484,849 | Paget | Oct. 18, 1949 |
| 2,618,120 | Papini | Nov. 18, 1952 |

FOREIGN PATENTS

| | | |
|---|---|---|
| 464,475 | Great Britain | Apr. 16, 1937 |
| 696,640 | Germany | Sept. 26, 1940 |